J. C. W. GRETH.
WATER PURIFYING APPARATUS.
APPLICATION FILED MAY 27, 1907.

935,303.

Patented Sept. 28, 1909.

2 SHEETS—SHEET 2.

Witness:
F. Staub.
S. V. Mackenzie

Inventor,
John C. W. Greth
By F. W. H. Clay
att'y

UNITED STATES PATENT OFFICE.

JOHN C. W. GRETH, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

WATER-PURIFYING APPARATUS.

935,303.  Specification of Letters Patent.  Patented Sept. 28, 1909.

Application filed May 27, 1907. Serial No. 375,340.

*To all whom it may concern:*

Be it known that I, JOHN C. W. GRETH, a citizen of the United States, residing at Pittsburg, in the State of Pennsylvania, have invented certain new and useful Improvements in Water-Purifying Apparatus, of which the following is a specification.

My invention relates especially to intermittent systems of purifying water and has for its primary objects, the provision of a series of tanks operated in succession to fill, chemically treat, and settle the water before carrying to the filters.

Other specific objects are to introduce the water in a more advantageous position and condition for chemical re-action than heretofore accomplished; to provide proper stirring means to manipulate the sediment and the re-action; to provide automatic stirring devices and automatic valves for keeping the tanks full; to economize power in stirring and generally to make such apparatus more nearly automatic and certain and efficient in its operation.

These objects and other advantages to hereinafter appear, I attain by means of the construction illustrated in preferred forms in the accompanying drawings.

Figure 1:
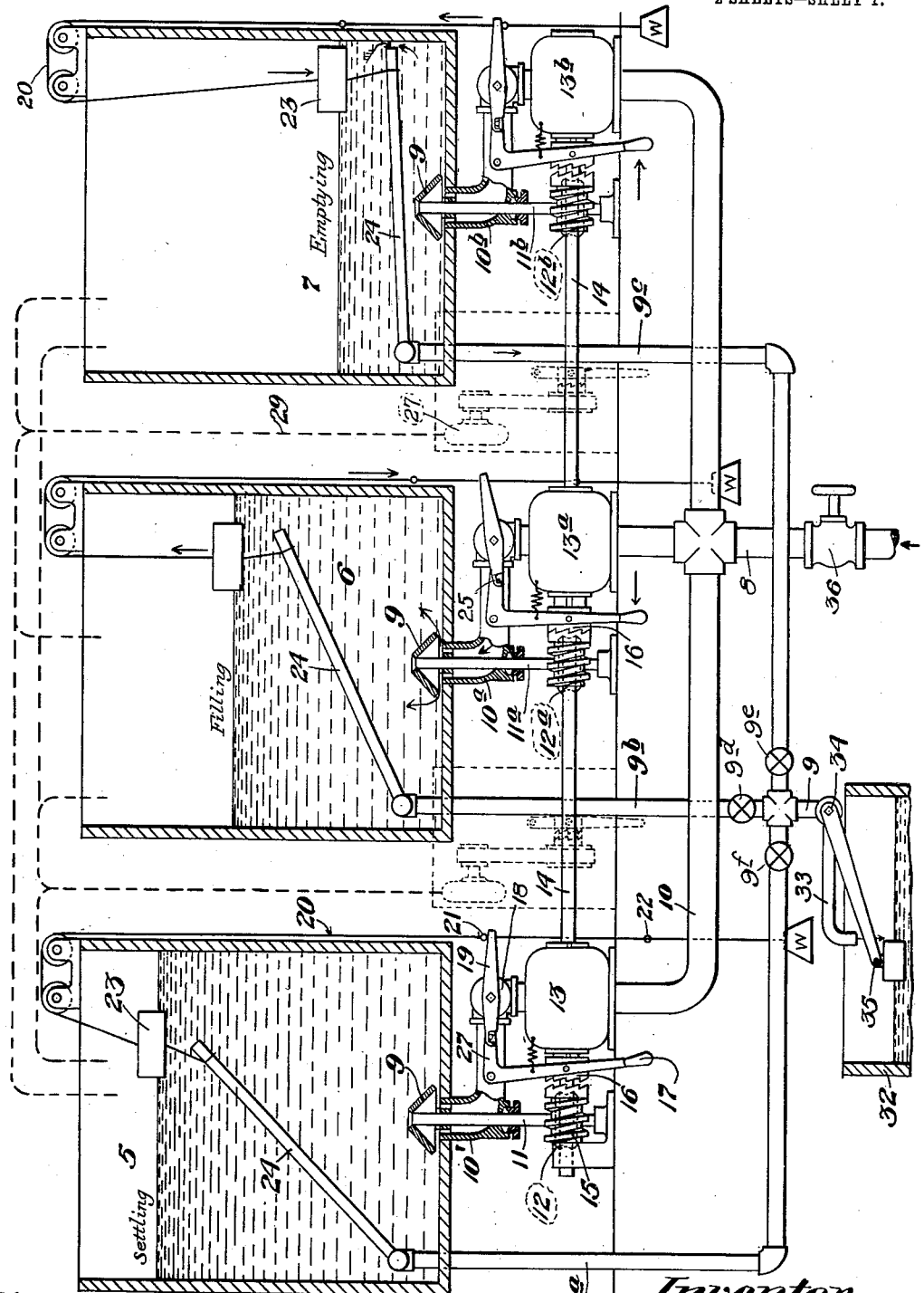
Figure 2:
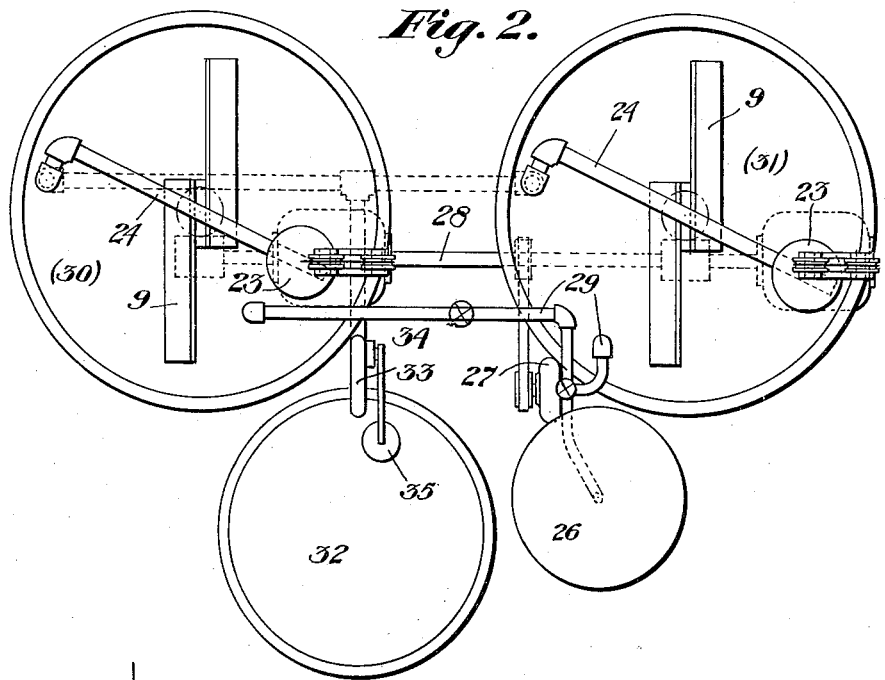
Figure 3:
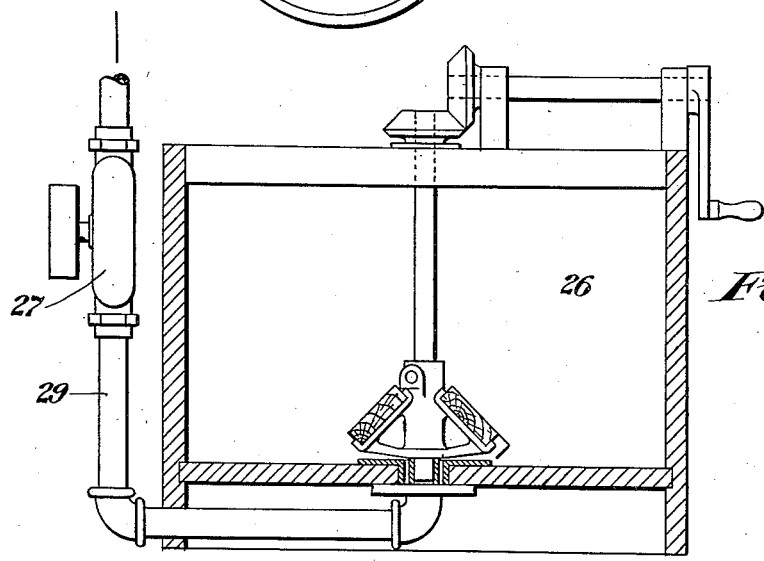

Figure 1 is a side elevation and partial vertical section of the main part of the apparatus as designed for a three tank system. Fig. 2 is a plan view of a two tank system, showing the filter and chemical mixer. Fig. 3 is a sectional view of a mixing device of particular value in this combination.

The problems to be met in an intermittent system of water purifying are complicated and among them is the difficulty of properly using the collected sludge of previous treatments to facilitate the precipitation of impurities. This depends much upon how the raw water is introduced, upon how the stirring device operates, and upon the speed of entry of the water and the speed of the stirring device. In the process of treating water to a re-agent to separate out and precipitate impurities, the action is better when the precipitate is in a flocculent state toward the end of the action and in order to avoid breaking up of the collecting particles of precipitate I find it necessary to gradually reduce the speed of the stirring device. And in order to properly intermix the previous sediment at just the proper time when the action begins, it is highly desirable to introduce the water at the bottom of the tank. Again a peculiarly efficient means for making a true solution of the lime or soda or other re-agent used is very important, because where lumps of calcium-oxid, for example, are introduced into the water, they become incrusted with calcium-carbonate and prevent the formation of the hydrates which cause the precipitation. In other words, all of the lime is not available unless it is introduced in the form of lime-hydrate. It is also highly desirable to introduce the chemical in a predetermined quantity, but it should be put in in large excess at the start of the action so that in conjunction with the precipitates it increases the action in their presence when it is mixed fresh and direct as a stream of hydrate. The same considerations apply to the sodium-carbonate often used as a re-agent, as the chemical may become crystallized by taking up water if it is dumped in in a solid state. It must be introduced as a sodium-carbonate solution and not in the form of sal-soda. Furthermore, the advantages of separate treating with lime and soda are well known. To meet these and other conditions efficiently I design the apparatus as shown in the drawings.

Referring first to Fig. 1 there are provided in this instance three tanks 5, 6 and 7 and they are all fed with raw water from the supply pipe 8, the water entering each tank directly under the inclined stirring paddles 9 through the branch pipes 10′, 10$^a$, and 10$^b$. The paddles 9 are revolved at the proper speed by means of a shaft 11 which extends downward and is provided with a gear 12 and driven by means of a water motor 13 in the branch pipe 10′, through its shaft 14 and the worm 15 engaging said gear. The shaft 14 will generally be in constant rotation, being connected to the three motors 13, 13$^a$ and 13$^b$ and under each tank there is provided a clutch 16 which is thrown into gear with the worm 15 by means of a lever 17. This may be conveniently operated by the handle 19 of the valve 18 which in turn is moved by the rising and falling of a cord 20 which is provided with buttons 21 and 22 at proper places to engage the valve handle 19 at the proper time. The tank has a float 23 which operates the cord 20 and at the same time operates the floating draw-off pipe 24, emptying the water through the outlet pipe 9$^a$ and 9 leading to the filters 32 as shown in Figs. 1 and 2. Each tank and its motor operates the same way. When the tank is empty, the float 23 will be at its bottom position, and thereupon, by reason of the lifting of the button 22, the valve 18 will be opened and at the same time the clutch 16 will be thrown into engagement. The water under pressure from supply pipe 8 will therefore begin to fill the tank 5 and operate its stirring paddles 9. The in-rushing of the water will assist the movement of the paddles, and it is to be particularly observed that the first action is to stir up the sludge both by the in-coming stream and the action of the paddles. It is also to be observed that the paddle and motor at first operate against a slight or no head of water, but as the tank fills the head of water increases which slows up the motion of the paddle and also the rate of entry of the water. That is, as the treatment is nearly finished the water is allowed to become more quiet and this greatly facilitates the precipitation. It will be understood that the chemical re-agent for treating the water will be introduced either at the beginning of this action or at any other time as desired, and as shown in Fig. 2, the chemical may be pumped in from the mixing tank 26 by means of a pump 27 also driven by belt from the motor shaft. Any desired device may be used for regulating the amount of chemical and the time of its introduction and I generally prefer to introduce the lime and soda at separate times. When tank 5 is filled, the float 23 will have allowed the cord 20 to drop down under its weight W until the button 21 strikes the handle 19 of the valve 18 and closes off the incoming water and at the same time allows spring lever 17 to shift the clutch 16 out of engagement, thus stopping the stirring paddle and allowing the water to settle. In many cases it is desirable to continue the stirring for some minutes after the tank is full, and in such case the clutch may be manually operated by handle 17, the construction at 25 allowing of independent movement to close the clutch against the spring shown, but not to re-open the valve. While the water in tank 5 is settling, the water in tank 7 may be emptying through the floating outlet pipe 24 and pipe 9ᶜ leading to the filter. The filter as shown in Fig. 1 I prefer to provide with a self-regulating inlet valve 34, and float 35, to keep it at a proper level as shown. The tank 6 in the meanwhile will be filling, as before described, and in general it will be understood that some one of the tanks is being filled all the time and that whenever any one of the motors is in use, the shaft 14 is revolving so that the chemical can be fed in by its pump or any one of the clutches may be thrown in to operate the stirrer whenever desired. It is also to be noted that when all of the tanks are full all of the motors are stopped and therefore the machinery is only running when actually being used.

In Fig. 2 I have shown a two tank arrangement, and the motors can be used in duplicate or a single motor used, the clutches being arranged properly to throw in either stirring device and the motor shaft always running when either inlet to the tanks is open as in Fig. 1. The chemical tank is preferably of the form shown in Fig. 3, which is specifically claimed in my Patent No. 855,631 of June 4th, 1907. By this means the chemical is reduced to a thoroughly mixed solution in the proper form for reaction, and no lumps can be introduced. The chemical tank 26 (Fig. 2) may be provided with a pump 27 run by a belt from the shaft 14 and the motors (shown in Fig. 1), and by means of the pipes 29 it will feed the chemical into either tank, at the time and in the quantity which may be desired. The re-action tanks 30, 31 are used in alternation and are operated as heretofore described for the three tank system. The outlet to the filter is provided with valves 9ᵈ, 9ᵉ, and 9ᶠ (Fig. 1). This filter 32 is preferably of the gravity type, and is fed from the pipe 33 as before described. In this system each tank automatically starts its stirring device and opens the water inlet whenever it is empty, and stops the motor and water inlet whenever it is full, and the filter inlet valve regulates the out-flow from the draw-off pipes. The whole apparatus is thus semi-automatic and the time of filling and emptying of course may be regulated by means of the main inlet valve 36 as shown in Fig. 1. The in-flow of the water takes place at the bottom and assists in the stirring up of sludge and also increases the speed of the paddles at the time when the stirring should be most vigorous. The water may be treated separately with the lime and soda and the precipitates are used to increase the chemical action. The stirring device operates against a heavier load as the action nears completion and it is also less assisted by the in-flow of water because such in-flow is slower under the heavier head, so that the stirring is accomplished in exact accordance with the requirements for good chemical action. Other advantages will readily occur to those familiar with the art.

Having thus described my invention what I claim as new and desire to secure by Letters Patent, is the following:—

1. In water purifying apparatus, the combination with a plurality of tanks, of a common water inlet under head, to the bottom of each tank, a motor and stirring device for each tank, and means whereby each stirring device is operated directly by the water coming into any one of the tanks.

2. In water purifying apparatus a reaction tank having a water inlet at its base, a motor operated by the incoming water, a stirring device placed over the water inlet and run by said motor and a float governing the starting and stopping of the in-flow of water, substantially as described.

3. In water purifying apparatus, a reaction tank having an inlet in its bottom, inclined stirring paddles placed over the inlet and in the path of the incoming water, a motor and gear to operate said paddles, a valve and float-operated means to open and close the valve and connect the motor drive gearing, substantially as described.

4. The combination with a reaction tank and a stirring device therein, of a water feed entering directly at the bottom of the tank, and a motor located at the bottom of the tank and driven by the incoming water, whereby the speed of the stirring device is dependent on the head of water in the tank.

5. An intermittent water purifying system, comprising a series of tanks, a common water inlet having branches to the several tanks, a water motor in each branch, and stirring devices in each of the tanks, and means to automatically operate the stirring device by said motor in any of the tanks, when any one of the tanks is being filled.

6. In a water purifying system, the combination of a reaction tank, a single water inlet at its bottom, a motor and a stirring device operated by the incoming water, whereby the speed thereof is varied directly, by varying the water level in the tank, and means to automatically open and close the inlet valve and simultaneously start and stop the stirring device respectively when the tank is empty and when it is full.

7. In water purifying apparatus, the combination of a reaction tank having a water inlet at its bottom, a motor therein forming part of the inlet conduit and driven by the incoming water, a stirring device in the tank operated by said motor, a float, a valve in the inlet connected to the float, and means by which the float opens the valve and starts the motor at once when the tank is empty and closes the valve and stops the motor at once when the tank is full, substantially as described.

8. In water purifying apparatus, the combination of a treatment tank provided with a water inlet at its bottom, a motor operated directly by the whole volume of incoming water, a stirring device driven by said motor, a float-actuated valve adapted to start the motor when the tank is empty and to stop the inflow and the motor when the tank is full.

9. In an intermittent water purifying system, the combination of a series of reaction tanks, a water inlet having branches to each of said tanks, a stirring device in each tank and a water motor in each branch of the inlet pipe operated by the whole of the incoming water for its own tank, and operating said stirrer, and automatic means governed by the water level in each tank to start and stop its own stirring device without affecting the motors in the other tanks.

10. In water purifying apparatus the combination of a series of tanks each having a water inlet, a motor placed in the inlet to each tank and said motors having a common shaft, and means by which each stirring device may be operated from said shaft when its tank is being filled, substantially as described.

11. In water purifying apparatus the combination with a series of treatment tanks each having a water inlet, of a motor in each inlet, a common shaft for the motors, and a stirring device in each tank and automatic means to connect the stirring device for operation by said shaft, when the tank is being filled.

12. In water purifying apparatus the combination with a treatment tank, a water motor and an inlet from the water motor to the tank, a shifting clutch revolved by the motor and operating a stirring device in the tank, a valve and means to open the valve and start the stirring device when the tank is empty and to close the valve and stop the stirring device when the tank is full.

13. In intermittent water purifying apparatus the combination with a plurality of treatment tanks, of a water inlet for each tank and a motor operated by the incoming water, a chemical tank having means to pulverize chemicals, a pump operated by the motor to feed the chemical from said chemical tank to the re-action tank, and means operated by the water level in the re-action tank to start and stop said motor, substantially as described.

In testimony whereof I have hereunder signed my name this 25th day of May, 1907, in the presence of the two subscribed witnesses.

JOHN C. W. GRETH.

Witnesses:
F. W. H. CLAY,
CHAS. S. LEPLEY.